Figure 1:
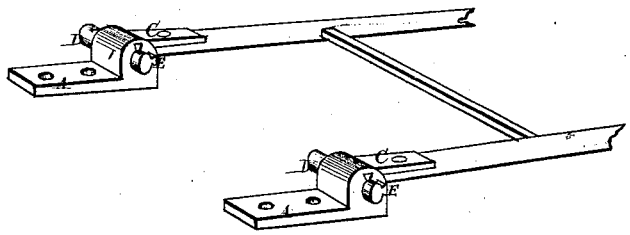

G. G. BURGESS.
Thill Coupling.

No. 110,823. Patented Jan. 10, 1871.

Witnesses.
Alpheus D. Smith
L. L. McClintock

Inventor.
George G. Burgess

United States Patent Office.

GEORGE G. BURGESS, OF GRAFTON, OHIO.

Letters Patent No. 110,823, dated January 10, 1871.

---

IMPROVEMENT IN ADJUSTABLE LOCK-COUPLINGS FOR VEHICLES.

---

The Schedule referred to in these Letters Patent and making part of the same.

---

I, GEORGE G. BURGESS, of Grafton, in the county of Lorain and State of Ohio, have invented certain Improvements in Adjustable Lock-Coupling for Vehicles, of which the following is a specification.

The nature of my improvement consists in the construction of an adjustable lock-coupling for connecting poles and thills to vehicles, as hereinafter more fully set forth.

The object of my improvement is to secure the greatest safety with the least expense, and, at the same time, make an article that is quickly and easily adjusted from one vehicle to another, without the perplexity of removing and replacing bolts and nuts.

Reference being had to the drawing hereto annexed and to the letters marked thereon, which make a part of this specification, in which—

Figure 1 is a perspective view of the parts together, and

Figure 2:
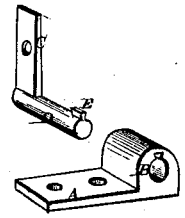

Figure 2 of them separate.

A is a clip-piece, which is made fast to the axle or other proper part of a vehicle.

C is a strap or rod, which is secured on the back end of the pole or thill.

D is a round hook, made or formed on or from the end of the strap C, and nearly at right angle.

E is a retaining block of any desired shape, and is made or formed on the side and end of the hook D.

B is a socket in the clip-piece A, and is made in shape and size to correspond with that of the end of the hook D and block E, and is made large enough to admit them to pass into and through the socket B when the clip A and strap C stand in the relation to each other as shown at fig. 2.

There are two sets of said clips and straps used, in order to connect the end of each thill, (see fig. 1,) or one at either end of the cross-piece of a pole, in the usual manner.

After the hooks D D are passed into the sockets B B, the pole or thills are dropped down to a horizontal position for use, when the blocks E E on the end of the hooks D D rest against the socket-side of the clip A, thereby effectually locking the hooks into their sockets, as shown at fig. 1.

I am aware that various devices have been used for connecting poles and thills to vehicles, and that some of them are patented, in which there should be nothing anticipated except from the exact combination set forth.

Believing that I am as justly entitled to a patent for a new combination for a similar purpose as those that have preceded me, I hereby disclaim the pintles B, spur C, recess E, and spring D, as shown and described in the patent of George T. Peansall, April 30, 1867; but

I claim—

In combination with the socket B, the hook D, and retaining-block E, when constructed and arranged to operate together, in the manner and for the purpose substantially as shown and set forth.

GEORGE G. BURGESS.

Witnesses:
S. G. WILMOT,
NETTIE WILMOT.